United States Patent [19]

Gart

[11] Patent Number: 4,862,165

[45] Date of Patent: Aug. 29, 1989

[54] ERGONOMICALLY-SHAPED HAND CONTROLLER

[76] Inventor: Samuel Gart, 4321 Colfax Ave., Studio City, Calif. 91604

[21] Appl. No.: 155,197

[22] Filed: Feb. 12, 1988

[51] Int. Cl.$^4$ ............................................. G09G 1/00
[52] U.S. Cl. ..................................... 341/20; 340/710; 74/471 XY; 273/148 B
[58] Field of Search .................... 341/20, 21; 340/706, 340/709, 710; 74/469, 471 XY; 273/148 B; 178/18-20

[56] References Cited

U.S. PATENT DOCUMENTS

| | | | |
|---|---|---|---|
| 3,517,678 | 6/1970 | Gilsdorf | 16/110 R |
| 3,835,464 | 9/1974 | Rider | 340/710 |
| 3,854,131 | 12/1974 | Vanderheiden et al. | 341/21 |
| 4,216,467 | 8/1980 | Colston | 341/20 |
| 4,550,250 | 10/1985 | Mueller et al. | 340/710 |
| 4,641,857 | 2/1987 | Gailiunas | 280/821 |
| 4,738,417 | 4/1988 | Wenger | 74/471 XY |

OTHER PUBLICATIONS

"Hand-Held Data Input Device" by P. J. Kennedy, IBM Tech. Discl. Bulleting; vol. 26, No. 11, 4/84.

Primary Examiner—Donald J. Yusko
Assistant Examiner—Tyrone Queen
Attorney, Agent, or Firm—Leonard Tachner

[57] ABSTRACT

An ergonomically-shaped hand controller of the type commonly referred to as a "mouse", is specially configured to prevent or reduce hand muscle fatigue despite continuous use over a protracted period of time. A housing for receiving the anterior surface of the hand comprises an arched metacarpalphalangeal support surface, distal phalange support surfaces for the volar pads of the thumb and forefinger and a medial ledge for supporting the remaining three ulnar fingers in a partially wrapped configuration with flexion of the distal, middle and proximal phalanges.

8 Claims, 3 Drawing Sheets

ERGONOMICALLY-SHAPED HAND CONTROLLER

BACKGROUND OF THE INVENTION

1. FIELD OF THE INVENTION

This invention relates generally to hand controllers such as those used for altering the display of a computer and more specifically, to an ergonomically improved hand controller which is shaped to minimize hand muscle fatigue even during a protracted period of continuous use.

2. PRIOR ART

The use of hand controllers for entering data into a computer for controlling the position of the cursor in a computer display and for generating signals in a computer controlled game is well-known in the art. By way of example U.S. Pat. No. 3,835,464 to Rider, owned by Xerox Corporation, discloses a hand-operated position indicator for a computer controlled display system. A hemispherical housing provides a plurality of buttons and a sphere located on a bottom structure supported on the underlying surface. The position of the sphere upon movement of the indicator device generates signals indicative of the position of the device and the buttons permit the user to generate signals at appropriate positions for controlling a CRT display. In more recent years the use of such controllers, now commonly called a "mouse", for generating signals input to a computer has become very common. The shapes of these devices have changed somewhat since the Rider patent issued in 1974 having become more rectangular in shape. However, the basic function remains substantially the same. Specifically, there is typically a housing which is movable over a flat surface adjacent a computer display. The bottom of the housing is enclosed by a planar member which has some form of sensor such as a mechanical sphere or an infrared imaging device to automatically keep track of the position of the controller and one or more buttons are normally provided to permit the user to activate the controller at selected positions relative to a reference point. Typically, there is one or more wires interconnecting the controller to the computer. However, it is also possible to transmit position, data and activation signals by other wireless means such as infrared transmission.

One common disadvantage of such a hand controller or mouse of the prior art is that the shape thereof is not ergonomically compatible with the user's hand. Consequently, after a protracted period of use such as many hours, it is not unusual for the muscles of the hand to become fatigued, making it uncomfortable and even painful to continue using such a controller without first resting the muscles of the hand. One of the reasons for the discomfort after continued use of a hand controller, is that the various surfaces of such prior art controllers are not designed to accommodate the anatomy of the hand in a configuration which would otherwise minimize muscle fatigue. Thus, for example, because it is typically necessary to engage only the palm of the hand with the top of the controller for moving it side to side and back and forth and further, since it is necessary to only have one or two fingers at the most, engage buttons positioned on the controller, there is no surface designed to receive the remaining three fingers, typically, the middle finger, the ring finger and the little finger. Consequently, the user must place those three fingers in the most comfortable position compatible with the shape of the controller surfaces and usually those shapes do not permit supporting those three fingers in a partially bent, comfortable position. Furthermore, the surfaces of prior art controllers that are adapted to be engaged by the hand are usually not designed to permit comfortable support of even the engaging surfaces and thus the thumb and forefinger become tired with protracted continuous use of the controller and the palm of the hand, which typically must remain fully extended on a relatively flat surface, also become fatigued.

There is therefore a long-felt need for a specially configured hand controller of the type hereinabove described which is adapted to provide ergonomically supporting surfaces for the entire hand structure thereby making it possible to avoid or at least substantially reduce hand fatigue after a long period of use of such controllers. There have been some attempts to provide specially shaped hand engaging surfaces in many other applications such as in the hand grips of crutches. However, all such prior art known to the applicant either do not provide the full ergonomic surface design of the present invention or are simply incompatible with the surface shapes needed in a hand controller as opposed to other hand-related applications.

Patent No. 3,854,131 to Venderheiden et al is directed to a communications device having a cursor which is slid on a board or panel having all the letters of the alphabet and numerals thereon. The cursor provides a body to which a hand rest or grip is mounted. The hand rest is designed to make it easier for a handicapped person to keep his hand on the cursor. However, the cursor does not include any switch elements, nor does it include the undercut curved areas for the middle, ring and small fingers.

Patent No. 4,550,250 to Mueller et al is directed to a cordless graphic input device for use with a computer system. The graphic input device includes a cylindrical housing with an overlaying cap member. The cap member is hemispherically formed so as to be easily and comfortably cupped within the hand of the user. However, the graphic input device does not have an undercut curved area for the middle, ring and small fingers, as provided in your system.

Patent No. 4,641,857 to Gailiunas is directed to a ski pole hand grip which allows the hand to engage the grip in a more natural position. The grip includes an imprint depression for placement of the thumb and imprint depressions for receipt of the other digits on the hand. Further, the hand grip includes a section which supports the ventral surface and central depression area of the palm of the hand. However, the shape and contour of the referenced grip, would not provide a suitable design for operating a computer input control device.

Patent No. 3,517,678 to Gilsdorf is directed to a hand grip for use with a crutch. The hand grip has an upper surface which includes a metacarpal-phalangeal area, a mid-palm area, a thenar area, and a hypothenar area. The inward facing side includes an undercut area for receiving the user's thumb. However, no undercut area is provided for the user's middle, ring and small fingers.

SUMMARY OF THE INVENTION

The present invention overcomes or substantially reduces the noted deficiencies of the prior art by providing a hand controller apparatus of the type used for generating a computer input, the apparatus having a housing which is ergonomically shaped to minimize hand muscle fatigue even during protracted period of continuous use. A preferred embodiment of the invention comprises seven separately identifiable surface shapes which are combined in an integral, unitary configuration of smooth interfacing surfaces to lend maximum comfort to the hand. These surfaces may be described as an arched metacarpal-phalangeal support surface upon which to rest the mid-palm of the hand, a concave thenar support surface upon which to rest the thenar pad of the hand, a substantially flat hypo-thenar ledge surface upon which to rest the hypo-thenar portion of the hand, an arch distal phalange support surface upon which to rest the distal volar pad of the forefinger, a concave lateral depression upon which to rest the distal volar pad of the thumb and a medial ledge upon which to rest the middle phalanges of the ring and small fingers, the bottom of the medial ledge being concavely shaped to receive the distal volar pads of these two fingers. A concave depression between the medial ledge and the arch distal phalange support surface receives the distal volar pad of the middle finger.

While a preferred embodiment of the invention having all of these distinct surface features has been reduced to practice, it will be understand that the present invention need not possess all of these distinct surfaces in order to provide substantial improvement over the period art. Thus for example, a hand control apparatus which has the arched metacarpal-phalangeal support surface, the concave thenar support surface and a medial ledge undercut to support the middle ring and small fingers of the hand and having more regular surfaces for the other portions of the hand, would still provide a great deal comfort as compared to the prior art known to the applicant.

Although the critical features of the invention reside in the shape of the housing, being a hand controller apparatus which is useable in conjunction with a computer or computer controlled game, the hand controller of the present invention also provides an underlying, generally planar support member for enclosing the housing and the electrical contents thereof and at least one relative movement sensor of the type previously described and which is well known in the art. In addition, the present invention would, like the prior art, typically provide at least one button or switch which is positioned adjacent preferably the volar pad of the distal phalange of the forefinger or the thumb or both, to permit the user to initiate an activation signal in much the same manner as the prior art.

OBJECTS OF THE INVENTION

It is therefore a principal object of the present invention to provide a hand controller apparatus of the type used for generating a computer input signal, the apparatus being ergonomically shaped to minimize hand muscle fatigue even during a protracted period of continuous use.

It is an additional object of the present invention to provide a computer input accessory apparatus of the type upon which a hand rests for selectively activating sensors, generating signals for effecting operation of the computer to which the apparatus is electrically connected, the apparatus being ergonomically shaped to minimize hand fatigue and including a housing configured for receiving the anterior surface of the hand and having a arched metacarpal-phalangeal support surface, a concave thenar pad support surface and an angular medial surface for supporting the remaining three ulnar fingers in a wrapped configuration.

It is still an additional object of the present invention to provide a hand controller apparatus of the type hereinabove described which further includes a substantially flat hypo-thenar ledge surface upon which to rest the hypo-thenar portion of the hand, an arched distal phalange support surface upon which to rest the distal volar pad of the forefinger, a concave lateral depression upon which to rest the distal volar pad of the thumb and a substantially planar member for stably engaging the controller with the underlying surface.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

Figure 1:
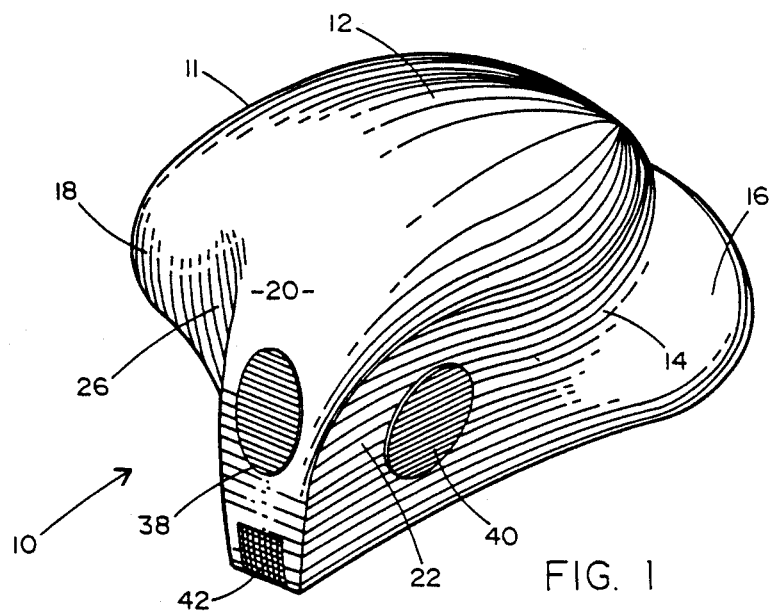
FIG. 1 is a perspective front left view of the hand controller apparatus of the present invention.
Figure 2:
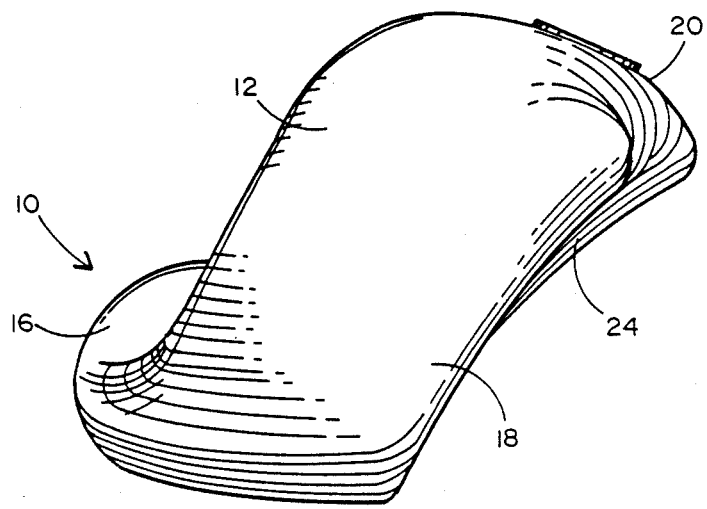
FIG. 2 is a perspective right rear view of the present invention.
Figure 3:
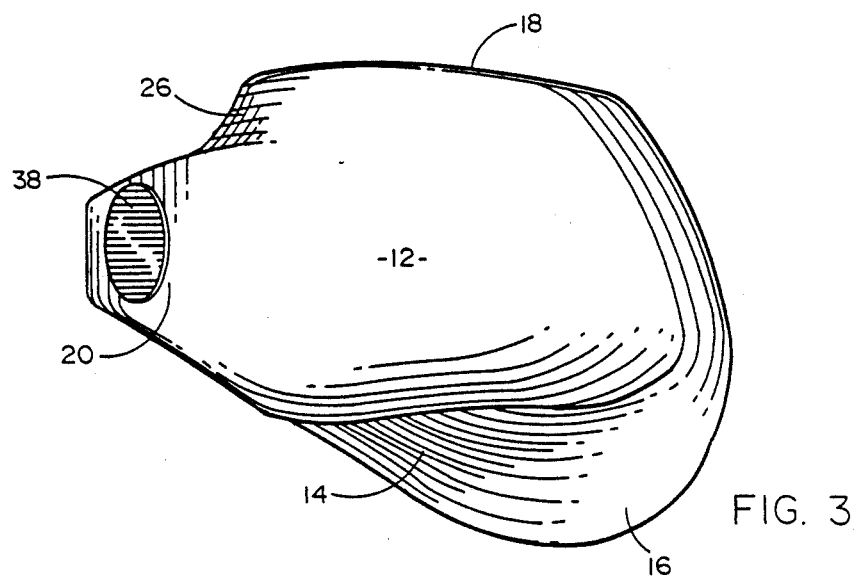
FIG. 3 is a top view of the invention.

The particular preferred embodiment of the invention shown in the accompanying figures and described herein is configured for use with the right hand. However, it will be understood that the invention can readily be configured for use with the left hand by simply providing a mirror image version of the right hand configuration. Furthermore, it will be understood that the present invention relates only to the physical configuration of the hand controller of the invention and not to its electrical or computer interface functions, both of which are well-known in the art and need not be described herein in any detail. Furthermore, as used herein the term "medial side" means that side of the hand closest to the small finger and the term "lateral side" means that side of the hand closest to the thumb.

Referring now to FIGS. 1–8, it will be seen that the hand controller 10 of the present invention may be generally described as having a housing 11 substantially enclosed by an underlying planar support surface 28. Housing 11 may be characterized as having a plurality of distinct hand supporting surfaces each shaped to accommodate support of a distinct portion of the hand in an ergonomically comfortable position to minimize hand fatigue. Each of these surfaces is relatively smooth and interconnected with adjacent surfaces in a manner which avoids any sudden discontinuities or sharp edges which would otherwise defeat the purpose for which the invention is intended. These various surfaces of housing 11 are identified as a metacarpal-phalangeal support surface 12, a thenar pad support surface 14, a hypo-thenar ledge surface 16, a medial ledge 18, a forefinger distal phalange support surface 20, a thumb distal phalange support surface 22, a concave ulnar finger support surface 24 and a middle finger distal phalange support surface 26.

As seen best in FIGS. 1, 2, 4 and 5, the metacarpal-phalangeal support surface 12 is provided with a gentle but clearly distinctive arch for support of the anterior surface of the hand and more specifically, the distal ends of the metacarpal bones of the four ulnar fingers as well as the proximal ends of the ulnar phalanges. The arch of surface 12 is preferably designed to permit a slight but comfortable flexion of these bones closely approximating the natural configuration of the hand during rest.

Thenar pad support surface 14 is, as best seen in FIGS. 1, 3, 7 and 8, a concave-shaped surface designed to receive the thenar pad portion of the palm. Accordingly, the curvature of surface 14 preferably receives the thenar pad of the hand in contiguous engagement so as to provide maximum support thereof and to minimize the possibility of any one area of the thenar pad receiving a disproportionate share of the engagement pressure.

As seen best in FIGS. 1, 2, 7 and 8, the hypo-thenar ledge surface 16 is a relatively flat extension of the thenar pad support surface 14 and extends therefrom to provide additional support for the region below the thenar pad thereby permitting the user to keep his wrist or carpus region extended above the surface below the hand controller with a minimum degree of discomfort or tendency to fatigue.

The medial ledge 18, best seen in FIGS. 1, 2, 3, 5 and 8, is a smoothly curved projection extending toward the medial side of the hand controller 10 primarily for supporting the middle phalanges of the ring finger and small finger. Immediately beneath the medial ledge 18 is a concave ulnar finger support surface 24 which is designed to support the distal volnar pads of the ring finger and small finger while allowing those two fingers to be in a comfortable position of flexion. This particular feature of the invention permits advantageous comfortable positioning of the ring and small fingers during their relative inactivity while using the hand controller. This feature in particular is one which the prior art controllers known to the applicant generally lack.

The middle finger is also one which usually remains inactive during operation of a hand controller. While some users may wish to position the middle finger immediately adjacent the ring finger using the medial ledge 18 and the underlying concave support surface 24 for this purpose, the present invention also provides a middle finger distal phalange support surface 26 in the form of a concave depression which resides between the medial ledge 18 and a forefinger distal phalange support surface 20 as seen best in FIGS. 1, 3 and 8. This concave middle finger support surface 26 permits the user to stably position the middle finger slightly spaced from the ring finger and elevated therefrom in a lesser degree of flexion which, it is believed, most users find the most comfortable position.

Figure 4:
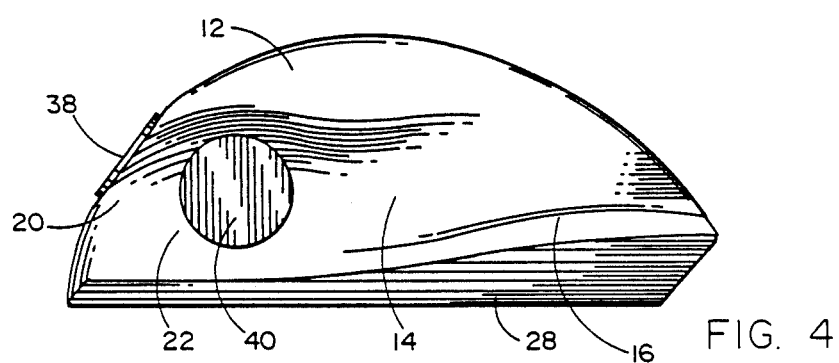
FIG. 4 is a left side view of the invention.
Figure 5:
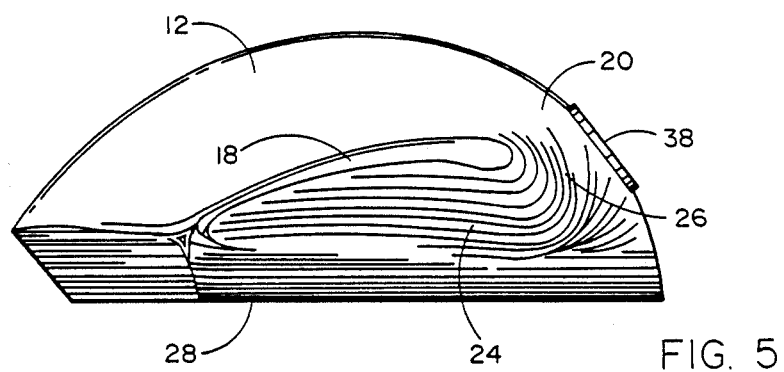
FIG. 5 is a right side view of the invention.
Figure 8:
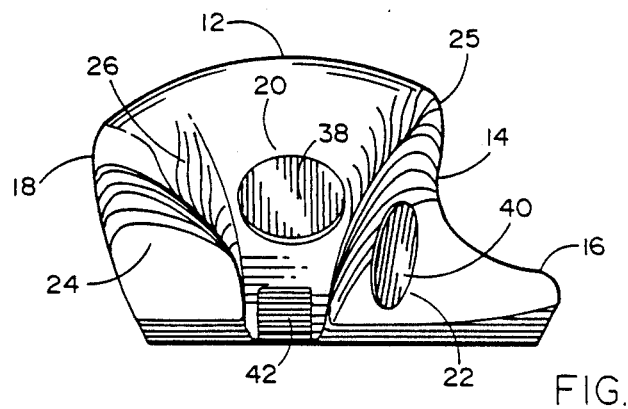
FIG. 8 is a front view of the invention.

The remaining surface of housing 11 distinctly identifiable in the accompanying figures, is the thumb distal phalange support surface 22 which may be seen best in FIGS. 1, 4 and 8. While this surface 22 may be flat, it has been found preferable to form this surface slightly concave and recessed from the lateral ledge 25 (seen FIG. 8) which is formed on the lateral side of support surface 12 and which forms a desirable bearing surface upon which to rest the anterior side of the joint between the two phalanges of the thumb.

Figure 6:
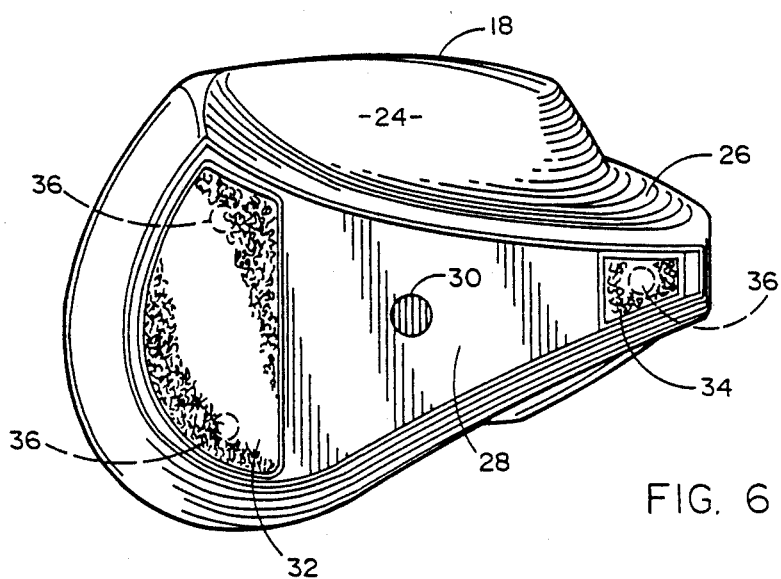
FIG. 6 is a bottom view of the invention.
Figure 7:
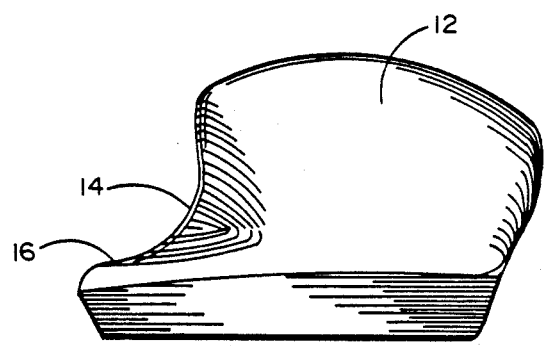
FIG. 7 is a rear view of the invention.

As seen best in FIG. 6, the hand controller 10 of the present invention also provides a planar supporting surface 28 which encloses the housing 11 and which may be secured to the other components of the hand controller 10 by means of a plurality of threaded holes 36 and screws (not shown). The planar supporting surface 28 in most cases will be provided with a relative position sensor 30 which may be a mechanical device such as an extended sphere as that disclosed in U.S. Pat. No. 3,835,464 to Rider alluded to earlier, or it may be an infrared imaging device or the like wherein the planar supporting surface 28 will merely provide an aperture for the passage of light energy therethrough. In any case, it is to be understood that the specific means for sensing relative position or for that matter, whether such means is utilized in a hand controller of the present invention, is not a feature of the present invention and is disclosed herein generically solely for the purpose of providing a complete disclosure.

Similarly, the planar supporting surface 28 of the present invention may also include a rear pad 32 and a front pad 34 which are provided to minimize friction between the hand controller 10 and the underlying surface for facilitating easy motion thereon. However, pads 32 and 34 are entirely optional and not limiting of the scope of the invention herein. Similarly, the housing 11 may be provided with one or more activation switches such as activation switch 38 for the forefinger which is seen best in FIGS. 1, 3 and 8 and an activation switch 40 for the thumb which is seen best in FIGS. 1, 4 and 8. It is to be understood that the inclusion of activation switches is not to be limiting of the scope of the invention herein claimed nor is it necessary to have both a thumb and forefinger switch in all cases.

Furthermore, a cable passage may be provided to physically interconnect the hand controller 10 with a computer or other device being controlled thereby. Alternatively, an aperture may be provided which is in the appropriate position on the hand controller to permit a wireless control implementation such as infrared transmission. A generic cable passage or aperture 42 is shown in FIGS. 1 and 8 for purposes of providing a complete description of a hand controller configuration, but not to be considered limiting of the scope of the invention.

It will now be understood that what has been disclosed herein comprises a novel hand controller apparatus of the type used for generating a computer input. More specifically, the hand controller of the present invention is of a type well-known in the prior art and typically called a mouse, for providing input signals to a computer or the like based upon the relative physical position of the device and the activation of one or more switches thereon. The present invention provides a housing which is ergonomically-shaped to minimize hand muscle fatigue even during a protracted period of continuous use. The housing may be characterized as having an arched metacarpal-phalangeal support surface, a concave thenar pad support surface, a distal phalange support surface for the forefinger, a distal phalange support surface for the thumb and an angular medial surface for supporting the remaining three ulnar fingers in a wrapped configuration with flexion of the distal, middle and proximal phalanges of the ulnar fingers. A preferred embodiment of the invention disclosed herein also provides a hypo-thenar ledge surface upon which to rest the hypo-thenar portion of the hand, an arched distal phalange support surface upon which to rest the distal volar pad of the forefinger, a concave lateral depression upon which to rest the distal volar pad of the thumb, a concave cutaway portion of the aforementioned medial ledge shaped to receive the distal volar pads of the ring and little finger and a concave depression positioned between the medial ledge and the arched distal phalange support surface for receiving the distal volar pad of the middle finger. The various surfaces and shapes of the housing herein described provide a comfortable and natural feeling support surface for virtually all of the anterior surfaces of the hand thereby permitting a positioning of the fingers and palm areas which closely approximate or duplicate the rested position of the hand thereby minimizing hand muscle fatigue.

Those having skill in the art to which the present invention pertains will now, as a result of the applicant's teaching herein, perceive various modifications and additions which may be made to the invention. By way of example, the precise shapes shown and described herein may be readily altered in varying degrees while achieving the essential objectives of the invention. Thus for example, the concave depressions beneath the medial ledge and adjacent the thumb support area may be made flat without substantially reducing the principal advantages of the invention. Accordingly, all such modifications and additions are deemed to be within the scope of the invention which is to be limited only by the claims appended hereto.

I claim:

1. A hand controller apparatus of the type used for generating a computer input, the apparatus being ergonomically shaped to minimize hand muscle fatigue even during a protracted period of continuous use; the apparatus comprising the following elements:
   (a) an arched metacarpal-phalangeal support surface upon which to rest the mid-palm of the hand;
   (b) a concave thenar support surface upon which to rest the thenar pad of the hand;
   (c) a substantially flat hypo-thenar ledge surface upon which to rest the hypo-thenar portion of the hand;
   (d) an arched distal phalange support surface upon which to rest the distal volar pad of the forefinger;
   (e) a concave lateral depression upon which to rest the distal volar pad of the thumb;
   (f) a medial ledge upon which to rest the middle phalanges of the ring and small fingers, the bottom of the medial ledge being concavely shaped to receive the distal volar pads of those two fingers; and
   (g) a concave depression between the medial ledge and the arched distal phalange support surface for receiving the distal volar pad of the middle finger;
   (h) each of said elements (a) through (g) being integrally arranged to form a continuous hand-bearing hollow housing enclosed by a substantially planar member for stable engagement with an underlying surface.

2. The apparatus recited in claim 1 further comprising a depressible switch positioned on said arched distal phalange support surface for selective activation by the distal volar pad of the forefinger.

3. The apparatus recited in claim 1 further comprising a depressible switch positioned on said concave lateral depression for selective activation by the distal volar pad of the thumb.

4. The apparatus recited in claim 1 further comprising means for removably securing said planar member to said housing whereby to provide selective access to the interior of said hollow housing.

5. The apparatus recited in claim 1 further comprising means on said planar member for sensing the relative position of said housing with respect to the underlying surface.

6. The apparatus recited in claim 1 further comprising means on said planar member for reducing the friction between said planar member and said underlying surface.

7. A computer input accessory apparatus of the type upon which a hand rests for selectively activating sensors generating signals for affecting operation of the computer to which the apparatus is electrically connected, the apparatus being ergonomically shaped to minimize hand fatigue; the apparatus comprising:
   a housing configured to receive the anterior surface of the hand and means for supporting said housing on an underlying surface;
   said housing having an arched metacarpal-phalangeal support surface, a concave thenar pad support surface, a distal phalange support surface for the forefinger, a distal phalange support surface for the thumb and an angular medial surface for supporting the three remaining ulnar fingers in a wrapped configuration with flexion of the distal, middle and proximal phalanges of said ulnar fingers.

8. The apparatus recited in claim 7 further comprising means for selectively separating said housing from said supporting means.

* * * * *